(12) United States Patent
Doke et al.

(10) Patent No.: US 11,062,177 B2
(45) Date of Patent: Jul. 13, 2021

(54) METHOD AND SYSTEM FOR CREATING AESTHETIC DESIGN AT SCALE

(71) Applicant: Tata Consultancy Services Limited, Mumbai (IN)

(72) Inventors: Pankaj Doke, Thane (IN); Sanjay Kimbahune, Thane (IN); Karan Bhavsar, Thane (IN); Sujit Shinde, Thane (IN); Mithun B S, Thane (IN); Sylvan Lobo, Thane (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 114 days.

(21) Appl. No.: 16/554,148

(22) Filed: Aug. 28, 2019

(65) Prior Publication Data

US 2020/0074225 A1 Mar. 5, 2020

(30) Foreign Application Priority Data

Aug. 29, 2018 (IN) .............................. 201821032321

(51) Int. Cl.
| | |
|---|---|
| *G06K 9/62* | (2006.01) |
| *G06K 9/00* | (2006.01) |
| *G06F 3/01* | (2006.01) |
| *G10H 1/00* | (2006.01) |

(52) U.S. Cl.
CPC ........... *G06K 9/6253* (2013.01); *G06F 3/017* (2013.01); *G06K 9/00342* (2013.01); *G06K 9/623* (2013.01); *G06K 9/6256* (2013.01); *G10H 1/0008* (2013.01); *G10H 2220/201* (2013.01)

(58) Field of Classification Search
None
See application file for complete search history.

(56) References Cited

U.S. PATENT DOCUMENTS

2012/0280927 A1 11/2012 Ludwig

OTHER PUBLICATIONS

SEditor: A Prototype for a Sign Language Interfacing System. Yi et al. (Year: 2014).*

(Continued)

*Primary Examiner* — Delomia L Gilliard
(74) *Attorney, Agent, or Firm* — Finnegan, Henderson, Farabow, Garrett & Dunner, LLP (57) ABSTRACT

The use of gestures are increasing frequently. Normally these gestures are disconnected with each other. Therefore, various methods have been used for creating the gestural language. The existing methods for creating gestural language is difficult to learn and lacks design aesthetics. A method and system for creating aesthetic design language using a plurality of gestures is provided. The system takes in to account of aesthetics of the generated form of gestures and the user's constraints of movement—degrees of freedom. The system is using a socio-techno system which aids the machine assisted creation of aesthetic language for gestural interactions. A grammar has also been defined for creating the gestural language based on the domain. In the final stage of the system, the grammar and the form symbols are chosen/selected/published to present the interaction language to the user.

9 Claims, 6 Drawing Sheets

(56) References Cited

OTHER PUBLICATIONS

Raptis, M. et al. "Real-Time Classification of Dance Gestures from Skeleton Animation," *Proceeding SCA '11 Proceedings of the 2011 ACM SIGGRAPH/Eurographics Symposium on Computer Animation*, Aug. 5-7, 2011; pp. 147-156.
Kahol, K. et al. "Automated Gesture Segmentation From Dance Sequences," *Proceedings of the Sixth IEEE International Conference on Automatic Face and Gesture Recognition*, 2004, May 19, 2004; 6 pages.
Shao, B. et al. "A New Dataset for Hand Gesture Estimation," *2017 IEEE Global Conference on Signal and Information Processing (GlobalSIP)*, Nov. 14-16, 2017; pp. 1388-1392.
Limonchik, B. et al. (2017). "3D Model-Based Data Augmentation for Hand Gesture Recognition," located at http://cs231n.stanford.edu/reports/2017/pdfs/218.pdf. (pp. 1-9).

\* cited by examiner

METHOD AND SYSTEM FOR CREATING AESTHETIC DESIGN AT SCALE

PRIORITY CLAIM

This U.S. patent application claims priority under 35 U.S.C. § 119 to: India Application No. 201821032321, filed on Aug. 29, 2018. The entire contents of the aforementioned application are incorporated herein by reference.

TECHNICAL FIELD

The embodiments herein generally relates to the field of aesthetic gestural interface, and, more particularly, to a method and system for creating an aesthetic design language at scale using a plurality of gestures.

BACKGROUND

Gestures are being used everywhere in today's world, for example, gestures are used in smartphones for performing any function or being used in play motion based games such as Xbox or Kinect. The use of gestural interfaces have grown a lot over a period of time. As the need of gestural interface has increased, the need of gestural language has also increased.

The creation of gestural language face multiple challenges. The contemporary set of gestural interfaces for ex. pinch-zoom, Slide up, 3 Finger slide, Hand wave etc. are isolated gestures and are used by the user to interact with a digital system. These gestures are used to instruct the computer to act or initiate an act. Theses gestures are disconnected with each other. They lack the notion of a language of communication with design aesthetics.

Yet another challenge is the creation or crafting of these gestures. They are typically crafted based on the collective wisdom of the team of creators or based on the views of an individual. They thus lack a methodological and scientific way of construction and the specification of a repeatable process of creation. Further, even the creations from a single team or a single individual do not exhibit the property of composition from a single root—in other words, the same team or individual is likely to come up with a totally different set of gestures in space and time—and even if they come somewhat closer to a prior creation, they would lack the ability of expressing the correlations between the created gestures and their predecessors or siblings.

Another property is the absence of aesthetics in the created gestures attributable to the basis gestures—the constituent form into which a gesture decomposes. Anything well designed, must have aesthetics.

Apart from these vagaries of creation, gestures are typically construed by the creators as a form of spatial expressions. The presence of temporality as a connecting segment between the gestures which attributes itself to the 'analog' nature of expression by a human being is lost in the discretized views of gestures. This causes sending to the background or to oblivion the aspect of temporal aesthetics which could originate in the gestures and be a source of better Usability for the user, as well as the observer of the gestures.

From a usability perspective, the creators assume the gestures for a universal user. The real world has many user archetypes—example, children, senior citizens, users with impairments et cetera. Hence the gestures created by the team or individual, which could be acted or constrained to be acted by the user, is not informed by the physiology of the user. Consequently, in the hands of users, such as kids (standard 4/5) or senior citizens (probably with ailments), these gestures have lower usability and lower design aesthetics.

Typically, a language consists of a set of symbols (Alphabets/Words), semantics (meanings attached to words) and syntax (grammar of the language). Based on the design of these elements, the composed language exhibits properties. In case of current gestures, either these properties are absent or if present, exhibit poor values. For example, the sequence of gestures can be said to lack the property of rhythm.

SUMMARY

The following presents a simplified summary of some embodiments of the disclosure in order to provide a basic understanding of the embodiments. This summary is not an extensive overview of the embodiments. It is not intended to identify key/critical elements of the embodiments or to delineate the scope of the embodiments. Its sole purpose is to present some embodiments in a simplified form as a prelude to the more detailed description that is presented below.

In view of the foregoing, an embodiment herein provides a system for creating an aesthetic design language using a plurality of gestures. The system comprises an input module, a memory and a processor. The input module provides a human model of a user as an input, wherein the human model is a representation of human body comprising body parts as sticks and body joints as rivets. The processor further comprises a form generator, a filter module, a theme classifier, a grammar defining module and an aesthetic design language creation module. The form generator generates a plurality of forms from the human model, wherein the plurality of forms are all the possible forms that can be generated from the human model based on the user's physical constraints. The filter module filters out the plurality of forms using a human assisted socio-techno engine to generate a corpus of the plurality of forms and the plurality of gestures, wherein the plurality of gestures are made using one or more plurality of forms. The theme classifier classifies the filtered plurality of forms into aesthetically compliant candidates against a template for a predefined themes. The grammar defining module defines a grammar in spatial domain and temporal domain corresponding to a plurality of aesthetically designed gestures. The aesthetic design language creation module creates the aesthetic design language by the user using an interface based on the defined grammar, the generated corpus and the classified aesthetically compliant candidates.

In another aspect the embodiment here provides a method for creating an aesthetic design language using a plurality of gestures. Initially, a human model of a user is provided as an input, wherein the human model is a representation of human body comprising body parts as sticks and body joints as rivets. In the next step, a plurality of forms is generated from the human model using a form generator, wherein the plurality of forms are all the possible forms that can be generated from the human model based on the user's physical constraints. In the next step, the plurality of forms are filtered out using a human assisted socio-techno engine to generate a corpus of the plurality of forms and the plurality of gestures, wherein the plurality of gestures are made using one or more plurality of forms. Further, the plurality of forms are filtered into aesthetically compliant candidates. In the next step, a grammar is defined in spatial domain and temporal domain corresponding to a plurality of aesthetically designed gestures. And finally, the aesthetic design language is created by the user using an interface based on the defined grammar, the generated corpus and the classified aesthetically compliant candidates.

In yet another embodiment, one or more non-transitory machine readable information storage mediums comprising one or more instructions is provided. The one or more instructions when executed by one or more hardware processors causes the one or more hardware processors to perform a method for optimizing scheduling of non-preemptive tasks in a multi-robot environment, the method comprising a processor implemented steps of defining, via a set of robots, a plurality of tasks, wherein each of the plurality of task is a non-preemptive schedulable task characterized by an arrival time, an execution time, a deadline and a performance loss function per time unit, and wherein each of the plurality of task is executed in the multi-robotic environment; merging, by one or more hardware processors, one or more previously assigned tasks and one or more newly arriving tasks from the defined plurality of tasks, wherein the one or more previously assigned tasks are non-executed tasks already assigned to one or more robots amongst the set of robots, and wherein the one or more newly arriving tasks comprise a non-executed task to be assigned amongst the set of robots; optimizing scheduling of the merged in the multi-robot environment, wherein the optimizing comprises scheduling, by implementing an Online Minimum Performance Loss Scheduling (OMPLS) technique, a first set of tasks amongst the set of robots, wherein the first set of tasks comprise tasks with a higher performance loss value amongst the merged tasks, and wherein the first set of tasks further comprise at least one task exceeding a threshold of waiting time and having a less priority over the tasks with the higher performance loss value; scheduling, via the OMPLS technique, a second set of tasks amongst the set of robots, wherein the second set of tasks comprise tasks that can be scheduled within their deadline and having a low performance loss value amongst the merged tasks; and minimizing, by a list-scheduling technique, a performance loss value of a remaining subset of tasks, wherein the remaining subset of tasks comprise tasks that cannot be scheduled within a predefined deadline.

It should be appreciated by those skilled in the art that any block diagram herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computing device or processor, whether or not such computing device or processor is explicitly shown.

BRIEF DESCRIPTION OF THE DRAWINGS

The embodiments herein will be better understood from the following detailed description with reference to the drawings, in which.

DETAILED DESCRIPTION

The embodiments herein and the various features and advantageous details thereof are explained more fully with reference to the non-limiting embodiments that are illustrated in the accompanying drawings and detailed in the following description. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Glossary—Terms Used in the Embodiments

The expression 'form', "forms" or "plurality of forms" in the context of the present disclosure refers to a basis construct which is actionable/doable by the user. It is determined by the physiology of the 'normal' user (body) and is practically constrained by the user archetype (physiological characteristics).

The expression "gesture" or "plurality of gestures" in the context of the present disclosure refers to a composition of basis forms or a singular form which has a semantic association and is actionable (theoretical view)/creatable/doable (can actually be done—say after injury) by the user. The semantic association of the gesture is in the hands of the transmitter (user) and the receiver (say Xbox) system based on shared semantics and context understanding.

Referring now to the drawings, and more particularly to FIG. 1 through FIG. 5, where similar reference characters denote corresponding features consistently throughout the figures, there are shown preferred embodiments and these embodiments are described in the context of the following exemplary system and/or method.

Figure 1:
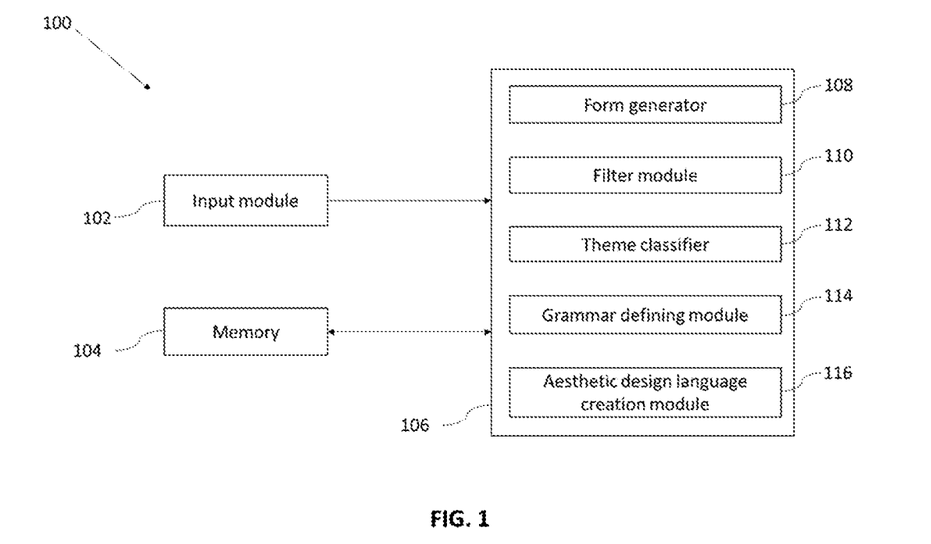
FIG. 1 illustrates a block diagram of a system for creating an aesthetic design language using a plurality of gestures according to an embodiment of the present disclosure.
Figure 2:
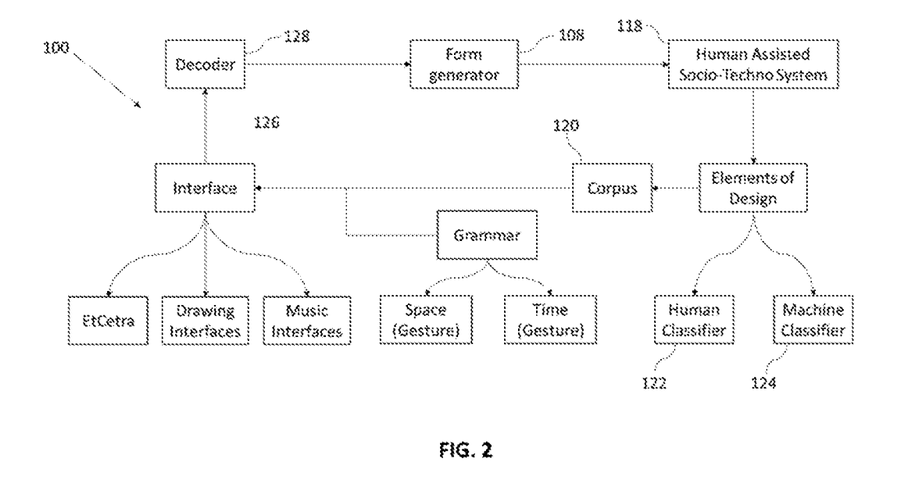
FIG. 2 shows an architecture of the system for creating an aesthetic design language using the plurality of gestures according to an embodiment of the disclosure.

According to an embodiment of the disclosure, a system 100 for creating an aesthetic design language at scale using a plurality of gestures is shown in the block diagram of FIG. 1 and in the architecture of FIG. 2. The system 100 is configured to provide a gestural language which is very easy to learn, has good design aesthetics and has properties which are amenable to compositions which exhibit such properties. The system 100 takes in to account of aesthetics of the generated form of gestures and the user's constraints of movement—degrees of freedom. The system 100 is using a socio-techno system which aids the machine assisted creation of aesthetic language for gestural interactions. A grammar has also been defined for creating the gestural language based on the domain. In the final stage of the system 100, the grammar and the form symbols are chosen/selected/published to present the interaction language to the user.

According to an embodiment of the disclosure, the system 100 further comprises an input module 102, a memory 104 and a processor 106 as shown in the block diagram of FIG. 1. The processor 106 works in communication with the memory 104. The processor 106 further comprises a plurality of modules. The plurality of modules accesses the set of algorithms stored in the memory 104 to perform a specific task. The processor 106 further comprises a form generator 108, a filter module 110, a theme classifier 112, a grammar defining module 114 an aesthetic design language creation module 116.

Figure 3:
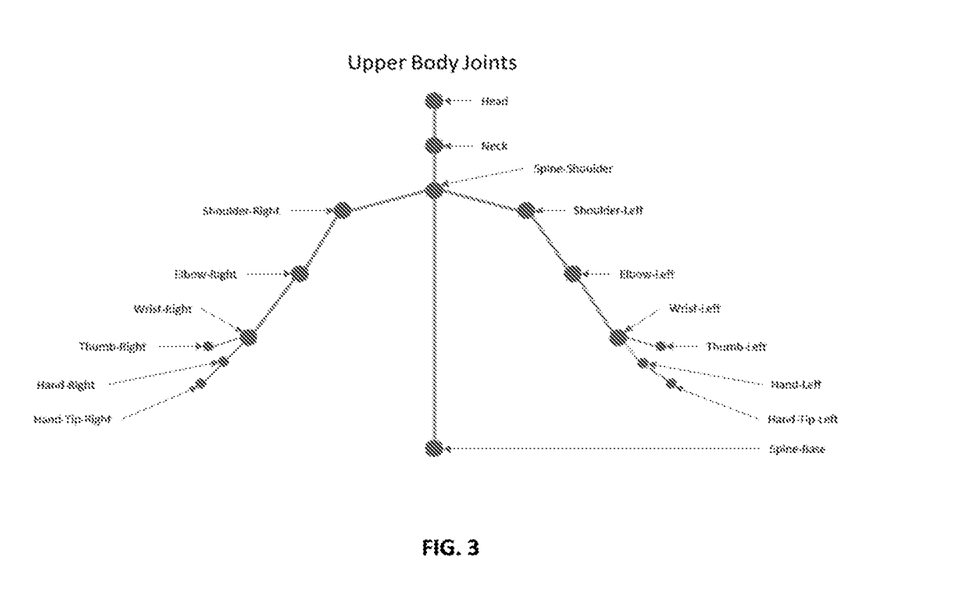
FIG. 3 shows a human model using riveted human body construct according to an embodiment of the present disclosure.

According to an embodiment of the disclosure, the input module 102 is configured to provide an input to the processor 106. The input module 102 is configured to provide a human model of a user as an input, wherein the human model is a representation of human body comprising body parts as sticks and body joints as rivets as shown in FIG. 3. In an example the input module 102 can be display screen of the smartphone which can be used to display the output. The input module 102 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite.

According to an embodiment of the disclosure, the system 100 comprises the form generator 108. The form generator 108 is configured to generate a plurality of forms from the human model. The plurality of forms are all the possible forms that can be generated from the human model based on the user's physical constraints. Given the node points of the human model, degrees of freedom and constraints, the form generator generates computationally all possible forms. Thus, based on the user archetype, different types of forms will be generated. For example, forms for an elderly person will be different as compared to young age child.

The representation of the human body (form) as a set of 'sticks' which are 'riveted' at 'junction points' (joints) is pictorially shown in FIG. 3. For example, the neck is riveted to the torso, the hands are riveted to the torso and the legs to the torso. Again the legs consist of two rivets joints. Similarly, the hands consist of 3 riveted joints.

Every human has a particular degree of freedom. The degree of freedom determines the angle and direction in which a particular 'arm' riveted to a joint can move. The form generator 108 computes the possible positions without upsetting the stability falling down of the structure (human body). Each position is then discretized to a set of 3 values from all possible sets of values. Thus, for example, for the leg (thigh) pivoted to the torso, the positions would be, on the floor, parallel to floor and closer to the torso. In other words, discretization of the movement/angle happens at 0/45/90 degree with a small tolerance value. The notion of stability would enforce that forms where both the legs (thighs) are parallel to the floor (the user is in air) would not be considered. However, such a condition would be allowed for the upper limbs (hands parallel to the ground—palms facing each other).

According to an embodiment of the disclosure, the system 100 also comprises the filter module 110. The filter module 110 is configured to filter out the plurality of forms using a human assisted socio-techno engine 118. The filtration results in the generation of a corpus 120 of the plurality of forms and the plurality of gestures as shown in the architecture of FIG. 2. The plurality of gestures are made using one or more plurality of forms. The plurality of gestures exhibit elements of design.

The filter module 110 classifies the generated plurality of forms into aesthetic compliant candidates using a human classifier 122 and a machine classifier 124. Initially, the plurality of forms are divided in to a training set and a data set. The data set comprises remaining part of the plurality of forms which are not in the training set. Further, the training set is provided to the human classifier 122 for classification. The training set is ground truth by the user into a set of classes (ex. happy, energetic etc.) and each class has further data elements of that class. In the next step, the result of classification of the training set is used to generate the machine classifier 124. And finally, the data set is classified using the generated machine classifier 124.

In the filter module 110, the aesthetics of the form and n-gram combinations are also determined based on rules of principles of design. In the present example, for the sake of use and higher usability, the n-gram are constrained to be a tri-gram. Thus, allows the user of the system 100 to retain the form construction and their rules in their working memory. These principles are codified as training (classification) data and supplied to a machine learning algorithm of the machine classifier 124. In an example, ID3 (Interactive Dichotomizer—3) has been used as the machine classifier 124. The training data is then used by a tree to train itself. Subsequent remaining data set is then provided as input to the tree for classification. The tree classifier is then outputted as a set of rules.

These rules then constitute the rules of aesthetics for given set of ngrams. In essence, if these n-grams were to appear (as seen in the visual performance of the user) then the recipient is likely to perceive them as 'aesthetic'. Thus, the filter module 110 creates the corpus 120 of aesthetic n-gram forms. In the present example, tri-grams have been used. These tri-grams are then further classified into clusters—which are called as bouquet and ikebana.

According to an embodiment of the disclosure, the system 100 further comprises the theme classifier 112. The theme classifier 112 is configured to classify the filtered plurality of forms into aesthetically compliant candidates. The output of the filter module 110 is provided to the theme classifier 112. The theme classifier 112 is configured to validate the resultant set against templates for themes (bouquets, ikebana). The theme classifier 112 also takes the cultural context from the user as the input, for example, occidental/oriental, electronic dance music (EDM) or Bollywood dance music. This is important since the interpretation of aesthetics of the performing art is interpreted in the context of the cultural context of the receiver/receiving user. For example, if a person who is fan of Bollywood music or Indian classical (vocal/Bhimsen Joshi) may not be able to appreciate heavy metal or rock, and the reverse is also true, that a person who like heavy metal may not be able to appreciate a Bhimsen Joshi or a Suman Kalyanpurkar music.

The association of the plurality of forms is flexible and is done via tagging based on designer's input to the training set. Thus a meta-sequence could be classified into mutually exclusive set and there could be some elements common to both. For example, let us take the forms, as shown below [a] and [b]. [a] consists of rapid back and forth movement of the body structure and [b] slow movement of the neck from top to bottom. It is possible that these could be put to two different cultural interpretations and hence two different user archetypes.

According to an embodiment of the disclosure, the system 100 also comprises the grammar defining module 114. The grammar defining module 114 is configured to define a grammar in spatial domain and temporal domain corresponding to a plurality of aesthetically designed gestures. The defined grammar is either context sensitive or context free based on the context of the domain and the problem. Further the defined grammar is populated to the system like flex/bison [lex/yacc]. These production rules can be specified for a particular use case as explained in the later part of the disclosure.

According to an embodiment of the disclosure, the system 100 also comprises the aesthetic design language creation module 116. The aesthetic design language creation module 116 is configured to create the aesthetic design language by the user using an interface 126 based on the defined grammar, the generated corpus and the classified aesthetically compliant candidates.

The interface 126 interfaces output of the design subsystem to music composition, drawing composition or to command and control (cAndC/c&c) structures. So, specifically, these are 'interface classes' which can be implemented by 'concrete classes' which can be instantiated based on the context. For example, J2EE implementation can have 3 jars—that is, implementation libraries—one for each context—music.jar, drawing.jar and cAndc.jar. When the web application starts up, it does a context lookup (JNDI lookup) or a database query to get the context. Once it gets this, then it uses the AbstractFactory class to instantiate classes from each jar implementing the specified interface. Thus, the system can be repurposed to different systems dynamically.

The interface 126 takes a n-gram (3-gram in our case) and maps it to an action context based on the semantics of the basis forms. Thus, the filter module 110 would liaison between the parser and semantic analyser on one hand and a target digital system on the other hand. For example, in case of C&C, it could be a 'command' like 'dir /s/p' to a window/DOS system, in case of drawing, it would be command to the renderer to sketch a 'straight line'.

According to an embodiment of the disclosure, the system 100 also comprises a decoder 128. The decoder 128 is configured to provide a feedback to the form generator 108. Whenever the user interacts with the system 100, some of the gestures will serve as the input to the form generator 108, the gesture will go the form generator again and will classify either as bad gesture or a good gesture.

Figure 4A:
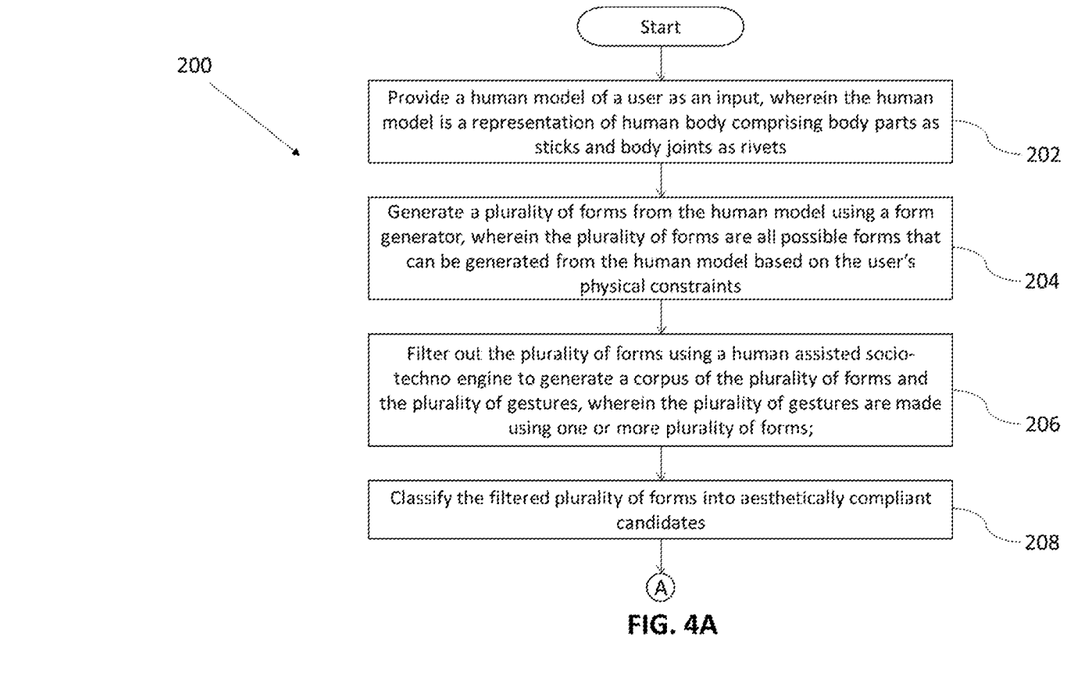
FIG. 4A-4B shows a flowchart illustrating steps involved to create an aesthetic design language using a plurality of gestures according to an embodiment of the disclosure.
Figure 4B:
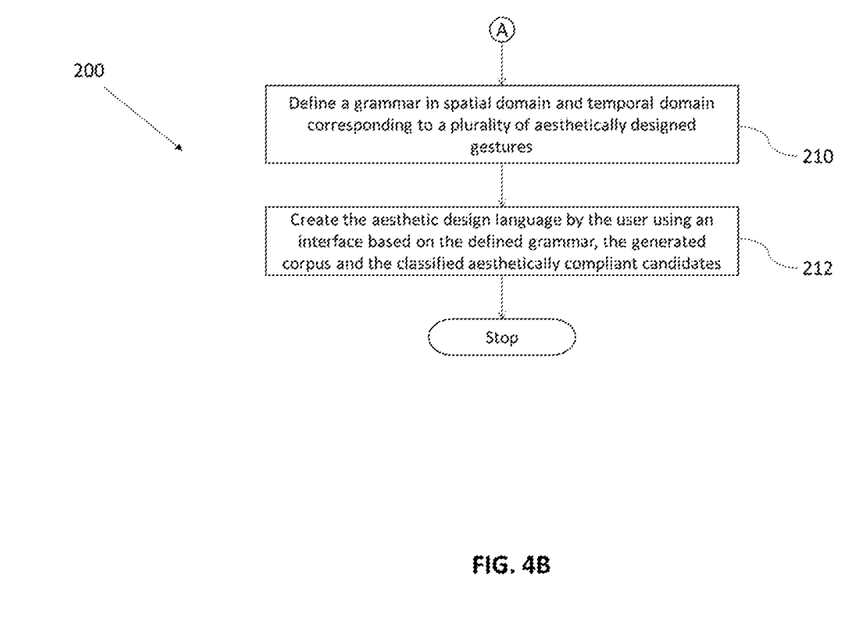

In operation, a flowchart 200 illustrating the steps of creating the aesthetic design language using the plurality of gestures as shown in FIG. 4A-4B. Initially at step 202, the human model of the user is provided as the input. The human model is a representation of human body comprising body parts as sticks and body joints as rivets. In the next step 204, the plurality of forms are generated from the human model using the form generator 108. The plurality of forms are all the possible forms that can be generated from the human model based on the user's physical constraints. The plurality of forms will be different for the young person as compared to the elderly person. At step 206, the plurality of forms are filtered out using the human assisted socio-techno engine 118. The filtering results in the generation the corpus 120 of the plurality of forms and the plurality of gestures, wherein the plurality of gestures are made using one or more plurality of forms. The filtering is performed using the human classifier 122 and the machine classifier 124.

In the next step 208, the filtered plurality of forms are classified into aesthetically compliant candidates. At step 210, the grammar is defined in the spatial domain and temporal domain corresponding to a plurality of aesthetically designed gestures. And finally at step 212, the aesthetic design language is created by the user using an interface based on the defined grammar, the generated corpus and the classified aesthetically compliant candidates.

According to an embodiment of the disclosure, the working of system 100 can also be explained with the help of following example. Following is a set of Joints (J): Joint (J): Head (H)|Neck (N)|Spine—Shoulder (SS)|Shoulder—Left (SL)|Shoulder—Right (SR)|Elbow—Left (EL)|Elbow—Right (ER)|Wrist—Left (WL)|Wrist—Right (WR)|Hand—Left (HL)|Hand—Right (HR)|Thumb—Left (TL)|Thumb—Right (TR)|Hand—Tip—Left (HTL)|Hand—Tip—Right (HTR)

Figure 5:
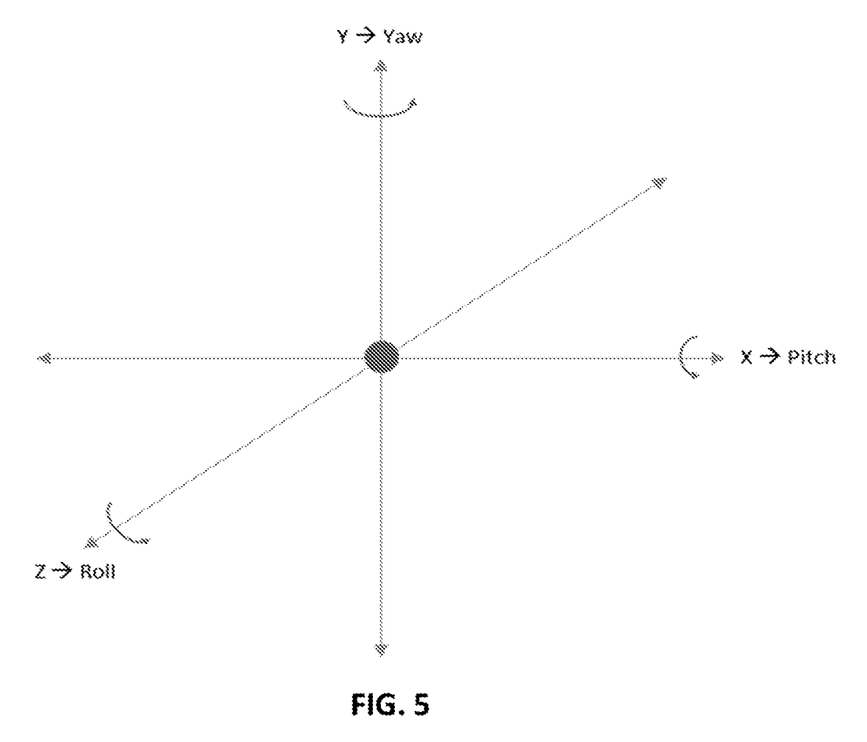
FIG. 5 shows a three axis representation of degree of freedom of the joints according to an embodiment of the disclosure.

Each joint has its own axis of orientation, comprising of three angles Yaw (Y) on y-axis, Pitch (P) on x-axis and Roll (R) on z-axis as shown in FIG. 5. x-axis runs horizontally parallel to the screen, the y-axis runs vertically parallel to the screen and the z-axis run perpendicular to the screen. Orientation is necessary to define normal joint constraints. Hence orientation set of a particular joint with all actionable/doable respective joint angles is written as shown in equation (1):

$$J \square J(Y,P,R) \ldots \quad (1)$$

where J is joint name, and subscript in parenthesis indicate yaw, pitch, and roll angles.

For example, a head can turn, up, down, left and right only a few degrees (Degrees of Freedom).
Head (H)$\square$H(0,0,0)|//Normal Position
H(−45,0,0)|H(45,0,0)|//Left and Right Position
H(−90,0,0)|H(90,0,0)|//Left and Right Position
H(0,−45,0)|//Bow down Position
H(−45,−45,0)|H(45,−45,0)|//Left and Right Bow down Position
H(0,45,0)|//Looking up Position
H(−45,45,0)|H(45,45,0)|//Looking Left and Right up Position
Where, the non-terminals are the italicized names, viz, Joint-Names example:
Head (H), Form-Names: HeadTilt, Gesture-Names example: Bow. Therefore a Form(F) would have following grammar:
F$\square$F&J
F$\square$FδJ
F$\square$J
F$\square$F&J|FδJ|J
&: is conjunction of two or more Forms(F) and Joint(J).
δ: is time delta separating two subsequent Forms(F).
And, a Gesture(G) would have following grammar:
G$\square$G&F
G$\square$GδF
G$\square$F
MetaForm-> Form: Form Form: Gesture: Gesture: Gesture Pranam: RightHandZeroDeg, LeftHand180Deg, Pranam2: HeadBow gesture: RightHand90Deg, RightHandZeroDegree, LeftLeg90Degree Similarly, for music the system 100 can be explained as follows: Say there is a Pulse with a Tempo, say 60 bmp (beats per minute). On this pulse, various rhythms can be set. Say, repeating units with 3 beats each are used, i.e. each rhythm can have only 3 beats. So there are various possibilities: R1=t+t+t, R2=2t+t, R3=t+t/2+t/2+t, etc.
So say we have a set of R with various rhythms={R1, R2, R3, etc.}

Now gestures are obtained that follow these rhythms, i.e. they are synced with the rhythm. In other words they start as specified in the rhythm set. So if R1 is selected. Each gesture will have a duration of time t. Say if there is a composition of gestures g1, g2, g3. To follow rhythm R1, g1 will take time t and immediately followed by g2 which will take time t, and then g3 which will take time t.

Now consider Rhythm R2. So g1 will take time 2t, and g2 will take time t. Similarly for rhythm R3, let's repeat one gesture say g2. So that g1 taking time t, g2 can be repeated twice in time t (taking t/2 each time) and then g3 for time t. In each case (g1+g2+g3) may keep repeating to have a sense of order. Or there could be a different set of (g4+g5+g6) to follow (g1+g2+g3), usually both following a single rhythm say R3. This can possibly be represented as follows: G: a set of gestures={g1, g2, g4, g4, g5, etc.}
R: a chosen rhythm
Composition C={a sequence of g such that g ε G and the sequence of g follows R} or even possibly C={a sequence of g such that g ε G and the sequence of g follows a pulse P of Temp T bmp}

Further, introducing harmony and unity are also introduced. This will restrict the set membership of G. Gq: set of gestures such that the composition can possibly be harmonious/or have unity. So all the g's in the Gq will have a unifying quality. But any random arrangement of g's in Gq may still not ensure harmony. So the arrangements of g's in a composition will make the composition harmonious if some specific rules are followed. Let these rules be called H.

In Gq, each g will have a specific importance. (Some g's are necessarily used as opening gesture, others are not. The way these g's are arranged can evoke different meaning and also harmony} Say, Gq={g1, g2, g3, g4, g5, g6, g7}

The Set of rules H for example could be {g1+g5: feels like a question; g1+g5+g7: feels like suspense, g5+g7: feels like suspense; g2+g3: no specific feeling, g5+g1: like and answer or closure}
Ch={a sequence of g such that g ε Gq, and the sequence follows rules in H} All this can also include Rhythm so that we have harmony+rhythm together. Chr={a sequence of g such that g ε Gq, and the sequence follows rules in H, and the sequence follow R}
The composition can be further embellished by adding notions of emphasis, accents and other design principles or musical expression.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein solves the challenges of gestural language which is difficult to learn, with poor design aesthetics and not implementable at scale. The disclosure provides a method and system for creating an aesthetic design language using a plurality of gestures.

It is, however to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a fieldprogrammable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

A representative hardware environment for practicing the embodiments may include a hardware configuration of an information handling/computer system in accordance with the embodiments herein. The system herein comprises at least one processor or central processing unit (CPU). The CPUs are interconnected via system bus to various devices such as a random access memory (RAM), read-only memory (ROM), and an input/output (I/O) adapter. The I/O adapter can connect to peripheral devices, such as disk units and tape drives, or other program storage devices that are readable by the system. The system can read the inventive instructions on the program storage devices and follow these instructions to execute the methodology of the embodiments herein.

The system further includes a user interface adapter that connects a keyboard, mouse, speaker, microphone, and/or other user interface devices such as a touch screen device (not shown) to the bus to gather user input. Additionally, a communication adapter connects the bus to a data processing network, and a display adapter connects the bus to a display device which may be embodied as an output device such as a monitor, printer, or transmitter, for example.

The preceding description has been presented with reference to various embodiments. Persons having ordinary skill in the art and technology to which this application pertains will appreciate that alterations and changes in the described structures and methods of operation can be practiced without meaningfully departing from the principle, spirit and scope.

What is claimed is:

1. A method for creating an aesthetic design language using a plurality of gestures, the method comprising a processor implemented steps of:
   providing a human model of a user as an input, wherein the human model is a representation of human body comprising body parts as sticks and body joints as rivets;
   generating a plurality of forms from the human model using a form generator, wherein the plurality of forms are all the possible forms that can be generated from the human model based on the user's physical constraints;
   filtering out the plurality of forms using a human assisted socio-techno engine to generate a corpus of the plurality of forms and the plurality of gestures, wherein the plurality of gestures are made using one or more plurality of forms, and wherein the filtering is performed using a human classifier and a machine learning classifier, the filtering comprises:
      dividing the plurality of forms into a training set and a data set, wherein the data set comprises remaining part of the plurality of forms which are not in the training set;
      providing the training set to the human classifier for classification;
      using a result of classification of the training set to generate the machine learning classifier;
      classifying the data set using the machine learning classifier;
   classifying the filtered plurality of forms into aesthetically compliant candidates, wherein the plurality of forms are considered aesthetically compliant if the plurality of forms comply to rules of aesthetics for given set of n-grams;
   defining a grammar in spatial domain and temporal domain corresponding to a plurality of aesthetically designed gestures; and
   creating the aesthetic design language by the user using an interface by taking n-gram and mapping the n-gram to an action context based on semantics of basis forms based on the defined grammar, the generated corpus and the classified aesthetically compliant candidates.

2. The method of claim 1, further comprising the step of providing a feedback to the form generator by a decoder to classify a gesture as a good gesture or bad gesture.

3. The method of claim 1, wherein the corpus is generated using n-gram combinations.

4. The method of claim 1, wherein the grammar is defined based on the context of the domain.

5. The method of claim 1, wherein the predefined template of themes is decided based on the cultural context of the user.

6. The method of claim 1, wherein the interface is in the form of a drawing or music.

7. A system for creating an aesthetic design language using a plurality of gestures, the system comprises:
   a memory; and
   a processor in communication with the memory, wherein the processor is configured to:
      provide a human model of a user as an input, wherein the human model is a representation of human body comprising body parts as sticks and body joints as rivets;
      generate a plurality of forms from the human model, wherein the plurality of forms are all the possible forms that can be generated from the human model based on the user's physical constraints;
      filter out the plurality of forms using a human assisted socio-techno engine to generate a corpus of the plurality of forms and the plurality of gestures, wherein the plurality of gestures are made using one or more plurality of forms, and wherein the filtering is performed using a human classifier and a machine learning classifier, the filtering comprises:
         dividing the plurality of forms into a training set and a data set, wherein the data set comprises remaining part of the plurality of forms which are not in the training set providing the training set to the human classifier for classification;
         using a result of classification of the training set to generate the machine learning classifier;
         classifying the data set using the machine learning classifier;
      classify the filtered plurality of forms into aesthetically compliant candidates against a template for a predefined themes, wherein the plurality of forms are considered aesthetically compliant if the plurality of forms comply to rules of aesthetics for given set of n-grams;
      define a grammar in spatial domain and temporal domain corresponding to a plurality of aesthetically designed gestures; and
      create the aesthetic design language by the user using an interface by taking n-gram and mapping the n-gram to an action context based on semantics of basis forms based on the defined grammar, the generated corpus and the classified aesthetically compliant candidates.

8. The system of claim 7, wherein the corpus is generated using n-gram combinations.

9. A computer program product comprising a non-transitory computer readable medium having a computer readable program embodied therein, wherein the computer readable program, when executed on a computing device, causes the computing device to:
   provide a human model of a user as an input, wherein the human model is a representation of human body comprising body parts as sticks and body joints as rivets;
   generate a plurality of forms from the human model using a form generator, wherein the plurality of forms are all the possible forms that can be generated from the human model based on the user's physical constraints;
   filter out the plurality of forms using a human assisted socio-techno engine to generate a corpus of the plurality of forms and the plurality of gestures, wherein the plurality of gestures are made using one or more plurality of forms, and wherein the filtering is performed using a human classifier and a machine learning classifier, the filtering comprises:
      dividing the plurality of forms into a training set and a data set, wherein the data set comprises remaining part of the plurality of forms which are not in the training set;
      providing the training set to the human classifier for classification;
      using a result of classification of the training set to generate the machine learning classifier;

classifying the data set using the machine learning classifier;

classifying the filtered plurality of forms into aesthetically compliant candidates, wherein the plurality of forms are considered aesthetically compliant if the plurality of forms comply to rules of aesthetics for given set of n-grams;

define a grammar in spatial domain and temporal domain corresponding to a plurality of aesthetically designed gestures; and creating the aesthetic design language by the user using an interface by taking n-gram and mapping the n-gram to an action context based on semantics of basis forms based on the defined grammar, the generated corpus and the classified aesthetically compliant candidates.

* * * * *